(12) United States Patent
Smith et al.

(10) Patent No.: US 7,117,700 B2
(45) Date of Patent: Oct. 10, 2006

(54) WHEEL-IMMOBILIZING DEVICE

(75) Inventors: Donna L. Smith, Santa Ana, CA (US); Dean H. Smith, Lafayette, CA (US)

(73) Assignee: D & D Security Resources, Inc., Anaheim, CA (US)

( * ) Notice: Subject to any disclaimer, the term of this patent is extended or adjusted under 35 U.S.C. 154(b) by 0 days.

(21) Appl. No.: 10/964,656

(22) Filed: Oct. 15, 2004

(65) Prior Publication Data

US 2006/0081025 A1    Apr. 20, 2006

(51) Int. Cl.
*B60R 25/00* (2006.01)

(52) U.S. Cl. .............................. 70/225; 70/226; 109/47; 109/52; 211/20

(58) Field of Classification Search .................. 70/225, 70/226, 14, 18, 19, 232, 237, 259, 260, 209, 70/228, 233–236, 227; 410/30, 20, 9, 10, 410/12, 19, 66; 16/42 R, 18 CG; 280/402; 180/287; 248/346.11, 551–553; D12/217; 188/32, 4 R; 109/45, 47, 50, 52; 312/249.8, 312/249.9, 249.11, 249.12, 249.13; 211/20, 211/19, 23, 24

See application file for complete search history.

(56) References Cited

U.S. PATENT DOCUMENTS

| | | | | |
|---|---|---|---|---|
| 354,010 | A | * 12/1886 | Black | .......................... 188/32 |
| 605,628 | A | * 6/1898 | Bradley | .......................... 211/5 |
| 636,629 | A | * 11/1899 | Butcher | .......................... 211/5 |
| 866,474 | A | 9/1907 | Keeran | |
| 1,101,883 | A | 6/1914 | Rochford | |
| 1,202,444 | A | * 10/1916 | Soleau | .......................... 211/4 |
| 2,442,023 | A | 5/1948 | Schwarzhoff | |
| 2,844,909 | A | 7/1958 | Perchinsky | |
| 2,915,850 | A | 12/1959 | Goodfellow | |
| 3,581,846 | A | 6/1971 | Janus | |
| D221,417 | S | * 8/1971 | Prichard | ....................... D8/333 |
| 3,709,519 | A | 1/1973 | Burrows | |
| 3,734,241 | A | 5/1973 | Hale | |
| 3,845,643 | A | 11/1974 | Barrett | |
| 4,138,763 | A | 2/1979 | Cooley | |
| 4,936,420 | A | * 6/1990 | Nenstiel | ....................... 188/37 |
| 4,993,609 | A | 2/1991 | Flint | |
| 5,255,545 | A | * 10/1993 | Wheeler | ....................... 70/232 |
| 5,263,553 | A | 11/1993 | Duncan | |
| 5,290,065 | A | * 3/1994 | Kassal | ....................... 280/825 |
| 5,479,794 | A | * 1/1996 | Rains | .......................... 70/226 |
| 5,689,981 | A | 11/1997 | DeLuca et al. | |
| 5,755,125 | A | 5/1998 | Charrette | |
| 5,782,115 | A | * 7/1998 | Judy | .......................... 70/164 |

(Continued)

FOREIGN PATENT DOCUMENTS

GB    2 184 276 A    6/1987

*Primary Examiner*—Lloyd A. Gall (57) ABSTRACT

The present invention provides a wheel-immobilizing device that does not require holes or indentations in the wheel in order for the device to be secured around the wheel or caster being immobilized. Additionally, a wheel-immobilizing device according to the invention is configured such that it may be placed on the ground in front of a cabinet, and the cabinet simply rolled into position with one of its casters between side walls of the device. The wheel-immobilizing device is then secured around the caster by passing a cross member or, in some embodiments, two cross members through the side walls on either side of the caster stem and then securing the cross member or members in position, thereby locking the wheel-immobilizing device to the caster of the cabinet and hampering rolling movement of the cabinet.

7 Claims, 7 Drawing Sheets

U.S. PATENT DOCUMENTS

6,116,062 A    9/2000   Markegard et al.
6,125,672 A   10/2000   Diez

2004/0188187 A1   9/2004   Curl

* cited by examiner

WHEEL-IMMOBILIZING DEVICE

BACKGROUND AND FIELD OF THE INVENTION

1. Field of the Invention

The invention relates to wheel-immobilizing devices. More particularly, the invention relates to a wheel-immobilizing device that is particularly suited to inhibit rolling movement of a wheeled cart or cabinet or other caster-supported item.

2. Background of the Invention

There are various instances in which it is desirable to prevent a wheeled item from moving. For example, it is known to immobilize cars for which violations have not been paid using what is referred to as a "Denver boot." A Denver boot has a clam-shell-type body and a blocking arm that protrudes from the body. The body is clamped around the wheel of a car and locked in place, and the blocking arm prevents the wheel from rolling by striking the ground or the underside of the car if moving the car is attempted. The Denver boot utilizes holes or indentations in the wheel in order for it to be secured to the wheel. The wheels or casters on many carts and cabinets, however, have no holes or indentations; therefore, a Denver boot-style device can not be used to immobilize them.

Various other immobilizing devices in which a wheel is enclosed within a clamshell-type arrangement are also known. In many of these devices, the wheel being immobilized must be raised off the ground in order for the device to be secured around it. If the cabinet to be immobilized is heavy, however, it may not be easy or possible to lift it. Therefore, a clamshell-type device that requires the wheel to be lifted from the ground in order to be installed is not suitable for immobilizing very heavy carts or cabinets.

SUMMARY OF THE INVENTION

The present invention provides a wheel-immobilizing device that does not require holes or indentations in the wheel in order for the device to be secured around the wheel or caster being immobilized. Additionally, a wheel-immobilizing device according to the invention is configured such that it may be placed on the ground in front of a cabinet, and the cabinet simply rolled into position with one of its casters between side walls of the device. The wheel-immobilizing device is then secured around the caster by passing a cross member or, in some embodiments, two cross members through the side walls on either side of the caster stem and then securing the cross member or cross members in position, thereby locking the wheel-immobilizing device to the caster of the cabinet and hampering rolling movement of the cabinet.

In a first aspect, the invention features a wheel-immobilizing device suitable for impeding rolling movement of a cart or cabinet supported by at least one stem-mounted wheel. The wheel-immobilizing device includes a generally flat base member and a pair of spaced apart side members extending upwardly from the base member. The side members define a wheel-receiving opening therebetween. A first cross member extends between the side members and is securely fixed between them, and first cross member is located at a position generally opposite to the wheel-receiving opening. A movable second cross member is also provided. In a first, open position, the second cross member does not extend between the side members; in a second, closed position, the second cross member does extend between the side members, at a position spaced from the base member and spaced from the first cross member, so as to block passage of the stem-mounted wheel through the wheel-receiving opening. The second cross member and the side members are cooperatively configured such that the second cross member can be secured in its second, closed position.

The wheel-immobilizing device is configured such that it can be secured to the wheel of the cart or cabinet by 1) placing the wheel-immobilizing device on a surface in a free-standing position with the side members extending upwardly from the base member and with the second cross member in its first, open position; 2) rolling the wheel of the cart or cabinet over the surface, through the wheel-receiving opening, and into a position on top of the base member and between the side members (with further rolling movement of the cart or cabinet being prevented by the first cross member); and 3) moving the second cross member into its second, closed position and securing it in the second, closed position, with the stem of the wheel extending upwardly between the first and second cross members and the wheel being disposed between the base member and at least the second cross member.

Various embodiments of the invention are contemplated. In particular, the second cross member may be a removable bar, and the side members may be formed as slotted side walls, with the removable bar passing through the slots in the side walls. More particularly, the bar may be an L-shaped bar with a hole in its free end. The L-shaped bar is then secured in its second, closed position by passing the upright portion of L-shaped bar through the slots in both of the side walls and securing a lock to the free end via the hole. The flange portion of the L-shaped bar prevents complete passage of the upright portion through the slots, and the lock prevents reversed passage of the upright portion through the slots.

Various configurations of the first cross member are possible. In one embodiment, it extends between the side members across a top portion of the wheel-immobilizing device. In another embodiment, it extends between the side members across a front-facing portion of the wheel-immobilizing device. In another embodiment, it extends all the way to the base member, effectively forming a front wall of the wheel-immobilizing device.

In another aspect, the invention features a wheel-immobilizing device having a generally flat base member and a pair of spaced apart side members. The device includes two movable cross members. In a first, open position for each cross member, the cross member does not extend between the side members; in a second, closed position for each cross member, the cross member does extend between the side members. The first and second cross members and the side members are cooperatively configured such that the first and second cross members can be secured in their respective second, closed positions.

According to this aspect of the invention, the wheel-immobilizing device is secured to the wheel of the cart or cabinet by 1) placing the wheel-immobilizing device on a surface with the first and second cross members in their respective first, open positions; 2) rolling the wheel of the cart or cabinet over the surface and into a position with the wheel on top of the base member and between the side members; and 3) moving the first and second cross members into their respective second, closed positions and securing the first and second cross members in their respective second, closed positions, with the stem of the wheel extending upwardly between the first and second cross members and the wheel being disposed between the base member and at least the second cross member.

Various embodiments of this aspect of the invention are contemplated. In particular, the first and second cross members may be removable, L-shaped bars. The side members may be formed as slotted side walls, and the L-shaped bars can be secured in their second, closed positions by passing upright portions of the L-shaped bars through the slots, then attaching a lock to the free end of each of the L-shaped bars.

Alternatively, one of the side members or a portion thereof may pivot relative to the base member, and the cross members can extend from the pivoting side member or side member portion. In that case, slots are formed in the opposite side member, and free ends of the cross members pass through the slots. The cross members are then secured in their closed positions by securing a lock to the end of either or both of the cross members.

BRIEF DESCRIPTION OF THE DRAWINGS

These and other features of the invention will become clearer in view of the detailed description below and the Figures, in which.

DETAILED DESCRIPTION OF EMBODIMENTS OF THE INVENTION

A first embodiment 10 of a wheel-immobilizing device according to the invention is illustrated in FIGS. 1, 2, 3A, and 3B. The device 10 includes a base unit 12 and a separate, removable cross member or locking bar 14.

Figure 1:
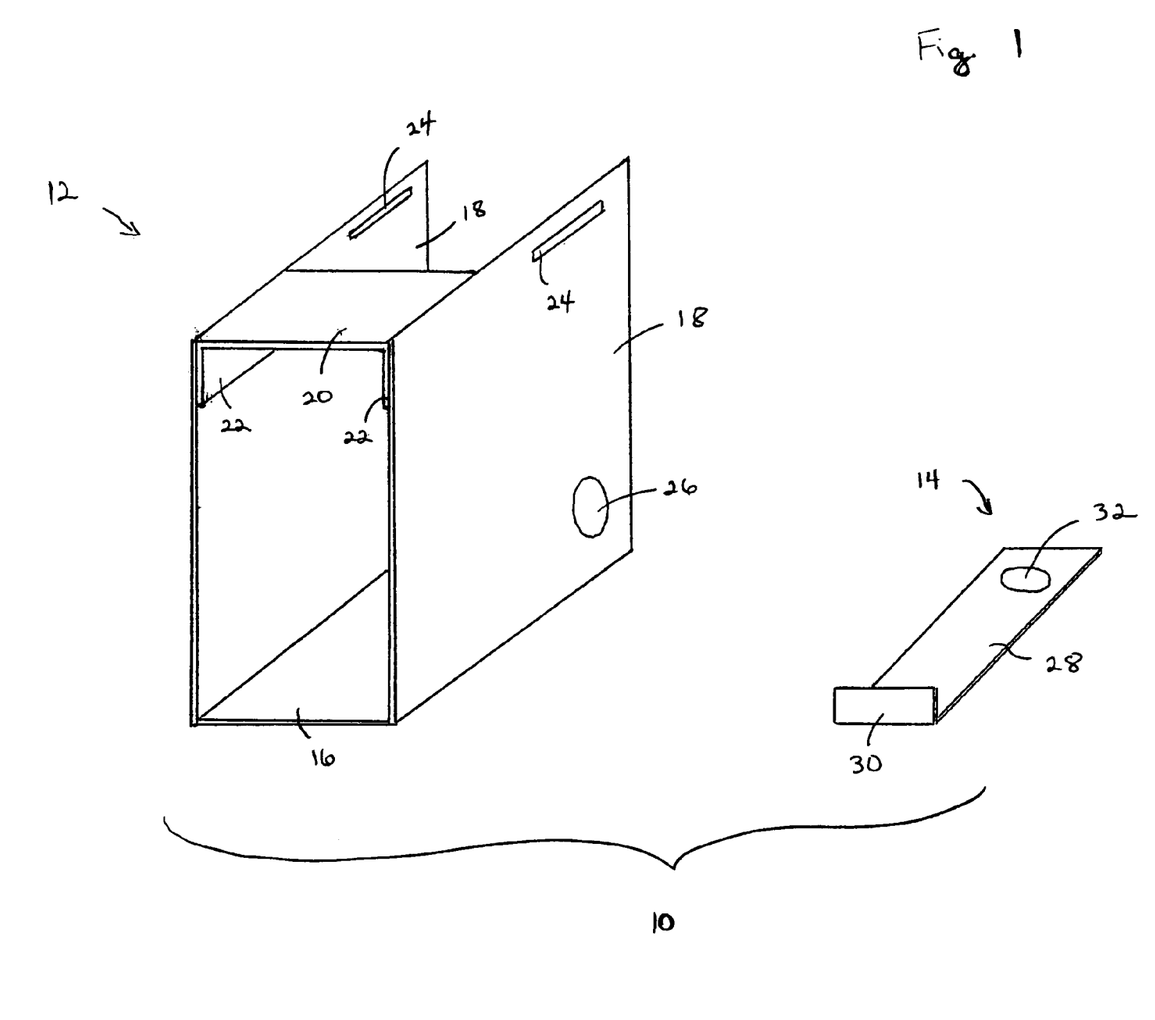
FIG. 1 is a perspective view of a first embodiment of a wheel-immobilizing device according to the invention.

The base unit 12 has a base member 16 and a pair of side walls 18 extending upwardly from the base member 16, giving the base unit 12 a generally U-shaped trough configuration. A fixed cross member 20 extends between the side walls 18 and is securely attached to the two side walls 18. As illustrated, the cross member 20 may be formed with a general bracket configuration, with the flange portions 22 of the bracket being spot-welded to the inner-facing surfaces of the side walls 18. The base unit 12 and the cross member 20 may be stamped from 16 gauge sheet metal (steel), then bent or roll-formed into their respective configurations before being welded together. A pair of slots 24 are formed through the side walls 18 and are located opposite to each other. If desired, another slot or hole 26 may also be formed in one (or both) of the side walls 18.

The locking bar 14 has an L-shaped configuration. The "upright" portion 28 of the L is slightly longer than the distance between the side walls 18 of the base unit 12, as illustrated in FIG. 3B, and the "flange" portion 30 of the L only needs to be long enough to secure the locking bar in its locking or closed position in the base unit 12, as explained in greater detail below. The locking bar may also be stamped from 16 gauge sheet metal (steel), then bent or roll-formed into its L-shaped configuration. A slot or hole 32 is formed through the end of the locking bar 14 that is opposite to the flange portion 30.

Figure 2:
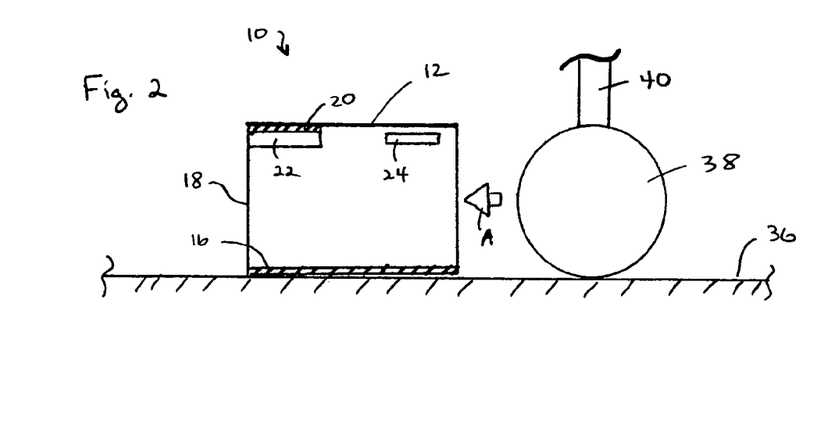
FIG. 2 is schematic section view of the wheel-immobilizing device shown in FIG. 1, illustrating the a cabinet caster being moved into position to be secured by the wheel-immobilizing device.
Figure 3A:
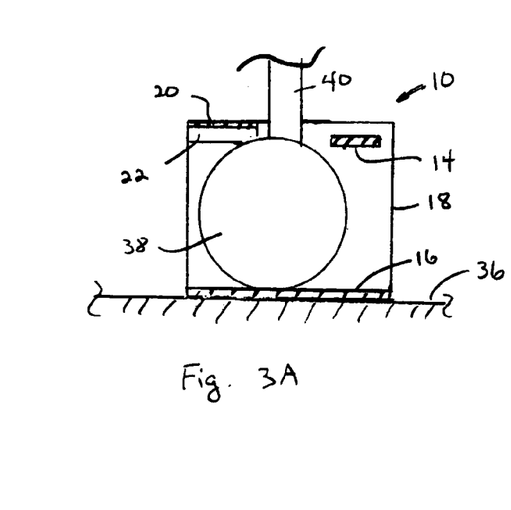
FIGS. 3A and 3B are a schematic section view and a schematic end view, respectively, of the wheel-immobilizing device shown in FIGS. 1 and 2, with the wheel immobilizing device secured to the cabinet caster.
Figure 3B:
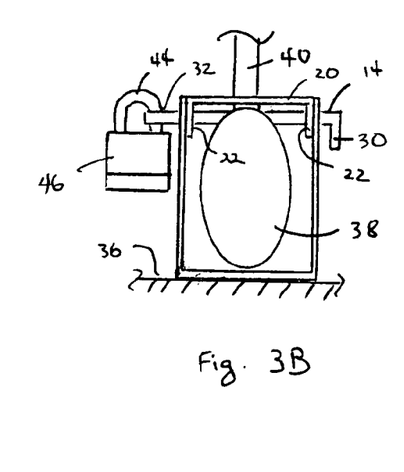

Use of the wheel-immobilizing device 10 to secure a cabinet supported by casters is illustrated in FIGS. 2, 3A, and 3B. As illustrated in FIG. 2, the base unit 12 of the wheel-immobilizing device 10 is placed on the floor or ground surface 36 on which the cabinet is supported, generally in front of or behind one of the casters 38, with the locking bar cross member 14 removed from the base unit 12 (i.e., in an open position). The cabinet is then rolled, as indicated by arrow A, such that the caster 38 rolls up onto the base member 16. Because the base member 16 is comparatively thin (16 gauge) and is considerably smaller in thickness than the diameter of the caster 38, it presents minimal impediment to the caster 38, so the caster is able to roll up onto the top of the base member 16. (To prevent the immobilizing device from skidding or being pushed out from under the caster, it may be desirable to coat the bottom surface of the base member 16 with rubber or other non-skid material or to provide it with cleats.) The cart can be rolled until the stem 40 of the caster contacts the cross member 20.

At that point, the locking bar 14 is inserted into the base unit 12 (i.e., is moved into its closed position). In particular, the "upright" portion 28 of the locking 14 bar is passed through the two slots 24 in the side walls 18 until the "flange" portion 30 of the locking bar 14 prevents further movement through the slots. The locking bar 14 is then secured to the base unit 12 by passing the shackle 44 of a lock 46 through the slot or hole 32 in the end of the locking bar and locking the lock, as illustrated in FIG. 3B.

As illustrated in FIG. 3A, the cross member 20 and the locking bar cross member 14 are close enough together to prevent the wheel or caster 38 from being lifted out of the wheel-immobilizing device 10 (e.g., by jacking up a heavy cabinet). Furthermore, the space between the two cross members 14 and 20 permits a slight amount of "play" of the wheel-immobilizing device 10 relative to the caster 38. Therefore, if someone tries to push the cabinet hard enough for the immobilizing device 10 to slide over the surface 36, the wheel-immobilizing device 10 will tend to tip upward onto an edge of the base member 16, which further hampers movement of the cabinet.

If desired, the cabinet being immobilized by the wheel-immobilizing device 10 can be further secured by passing a cable through the slot or hole 26 and locking it to an immovable object such as a wall.

Figure 4:
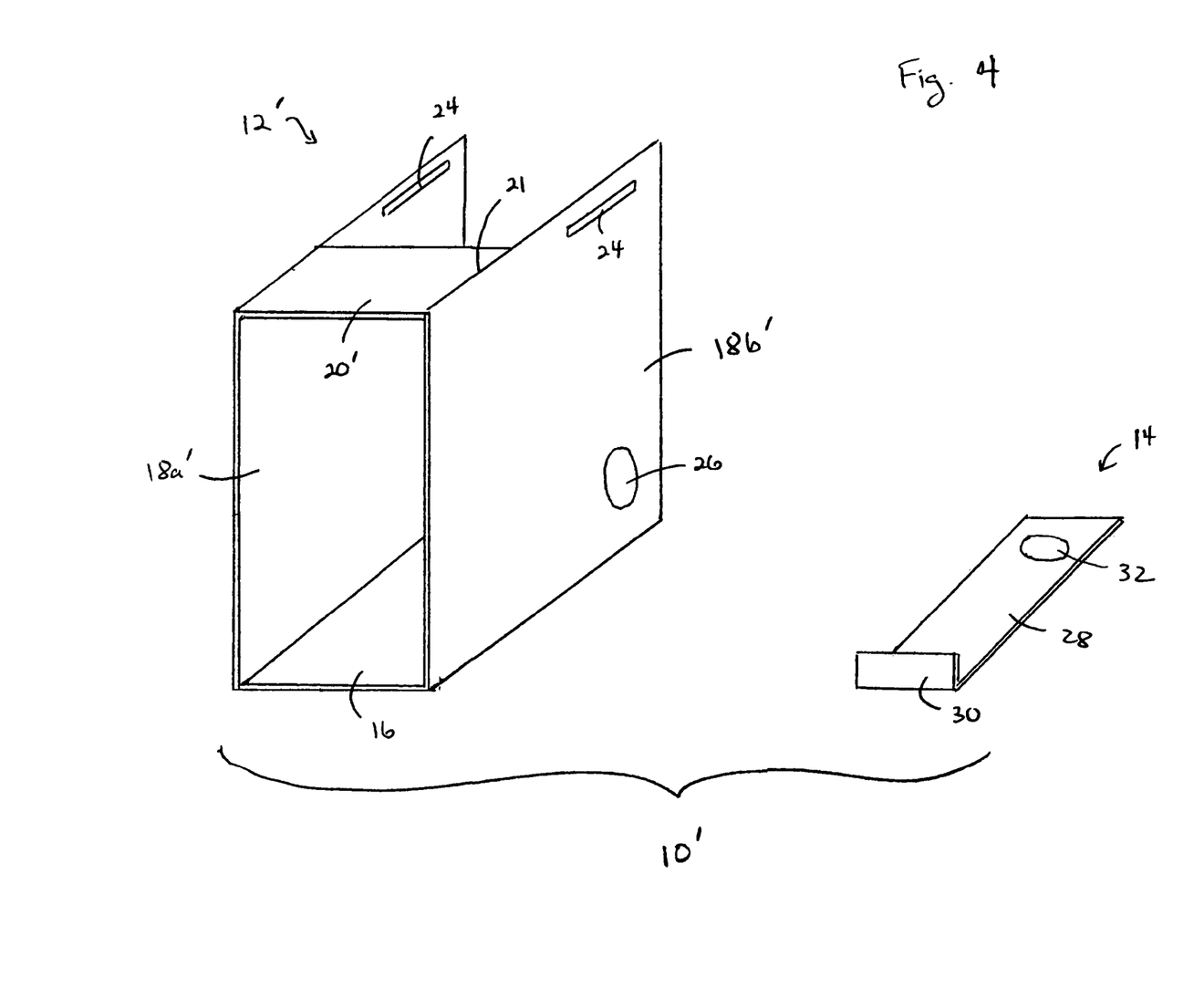
FIG. 4 is a perspective view of a second embodiment of a wheel-immobilizing device according to the invention.

A slightly modified construction of the base unit is illustrated in FIG. 4. According to this modified embodiment of the invention 10', the base unit 12' is fabricated from a single, contiguous sheet of material. Thus, rather than a separate, bracket-shaped cross member that is spot-welded into place between the two side walls, the cross member 20' in FIG. 4 is formed as an extension of one side wall 18' that is folded over by 90° relative to the one side wall 18a' and welded to the opposite side wall 18b' along the seam or junction 21 between the two. The construction and use of the wheel-immobilizing device illustrated in FIG. 4 is otherwise the same as that illustrated in FIGS. 1, 2, 3A, and 3B, and corresponding features are accordingly numbered the same in FIG. 4 as in FIGS. 1, 2, 3A, and 3B.

Figure 5:
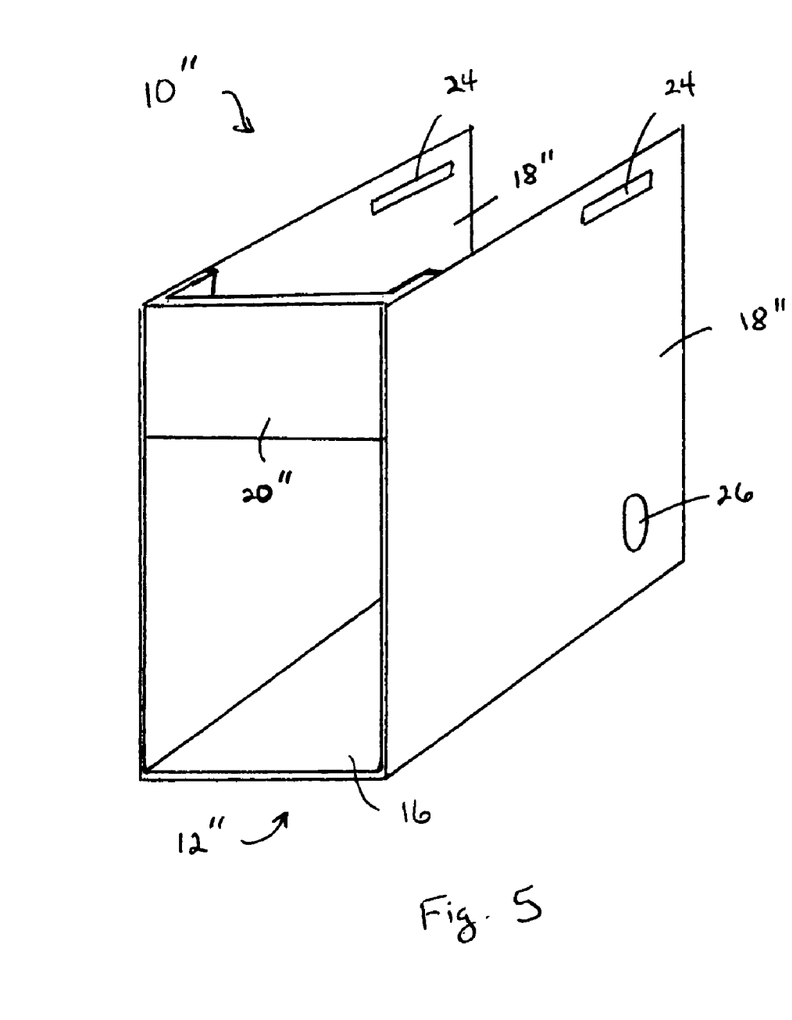
FIGS. 5 and 6 are a perspective view and a schematic section view, respectively, of a third embodiment of a wheel-immobilizing device according to the invention.
Figure 6:
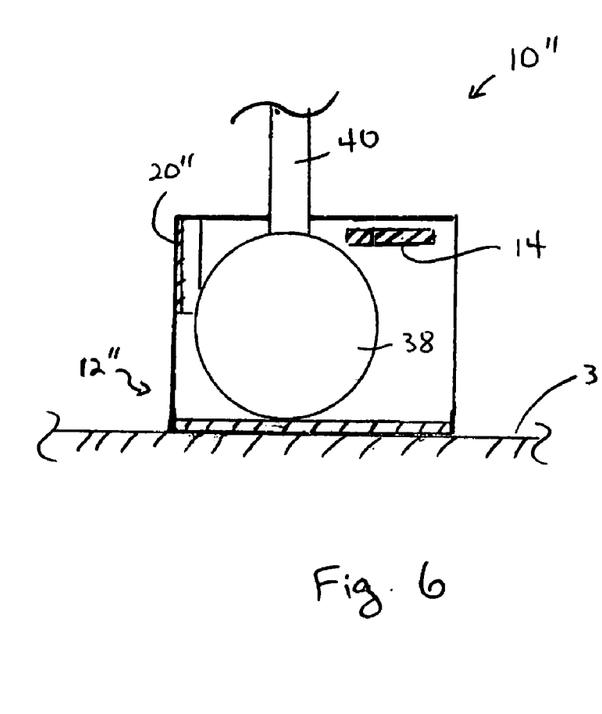

Yet another slightly modified embodiment of the invention 10" is illustrated in FIGS. 5 and 6 (locking bar 14 not illustrated in FIG. 5). Whereas the cross members 20 and 20' extend between the side walls 18 and 18' at the tops of the base units 12 and 12', respectively, in the embodiments illustrated in FIGS. 1–4, the cross member 20" extends between the side walls 18" along the front of the base unit 12" illustrated in FIGS. 5 and 6, generally near the top or upper portion of the base unit 12". The cross member 20" may be fabricated as a separate, bracket-shaped member that is spot-welded into place between the side walls 18" in the same manner as the cross member 20 in FIGS. 1–3B, which is the construction illustrated in FIGS. 5 and 6, or it may be fabricated as an extension of one of the side walls then folded over by 90° and welded to the opposite side wall along a joint between the cross member and the opposite side wall in a similar manner as the embodiment illustrated in FIG. 4. As is the case for the embodiment of the invention illustrated in FIG. 4, the construction and use of the wheel-immobilizing device illustrated in FIGS. 5 and 6 is otherwise the same as that illustrated in FIGS. 1, 2, 3A, and 3B, and corresponding features are accordingly numbered the same in FIGS. 5 and 6 as in FIGS. 1, 2, 3A, and 3B.

Figure 7:
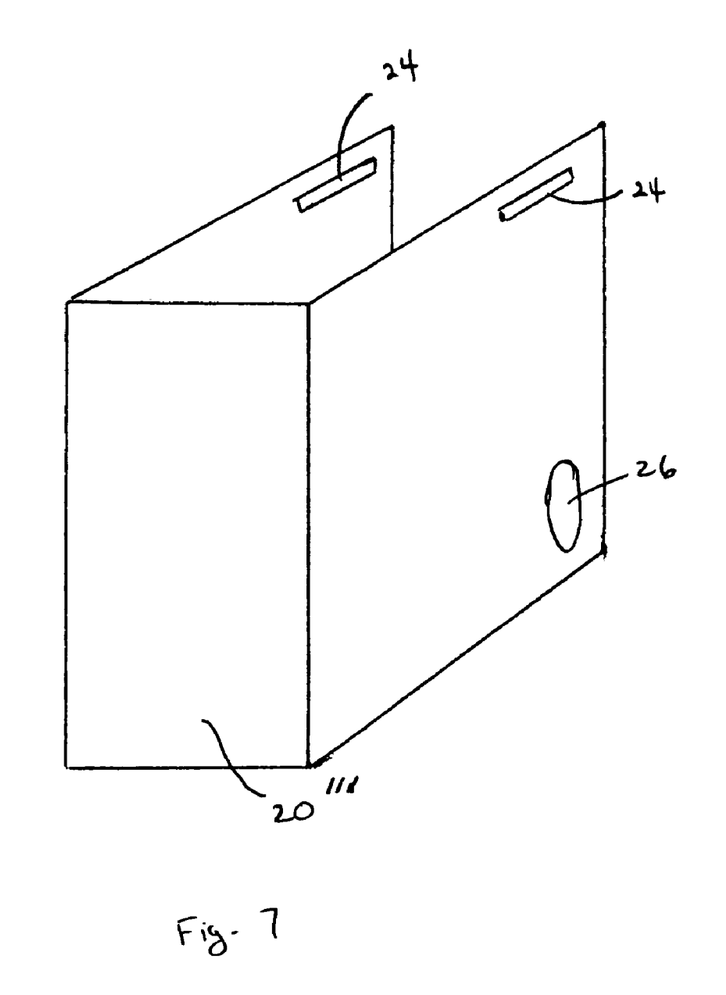
FIGS. 7 and 8 are a perspective view and a schematic section view, respectively, of a fourth embodiment of a wheel-immobilizing device according to the invention.
Figure 8:
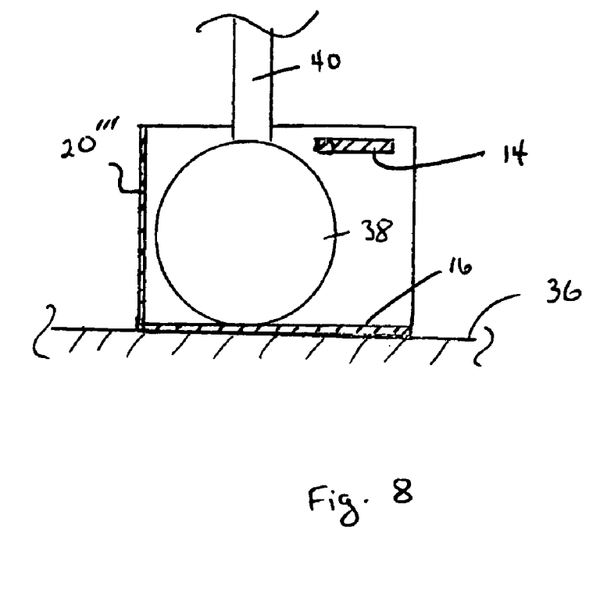

As illustrated in FIG. 6, like the embodiments illustrated in FIGS. 1–4, the distance between the fixed, front cross member 20" and the locking bar cross member 14 is small enough that the wheel of the caster 38 is effectively trapped between the two cross members. This prevents the wheel-immobilizing device 10" from being removed from the caster 38, e.g., by lifting the cabinet being secured with the wheel-immobilizing device. Even if the fixed front cross member extends all the way down to the base member such that it effectively forms a front wall member 20''', as illustrated in FIGS. 7 and 8, so long as the distance between that front wall member 20''' and the locking bar cross member 14 is less than the diameter of the caster 38, the wheel-immobilizing device will be securely fastened around the caster 38.

In the embodiments of the invention illustrated in FIGS. 1–8 and described above, a fixed cross member (20, 20', 20", or 20''') and a removable cross member (locking bar cross member 14) are provided to secure the base unit to the caster. As illustrated in FIGS. 9, 10, 11A, and 11B, however, a wheel-immobilizing device according to the invention may include two removable locking bar cross members.

Figure 9:
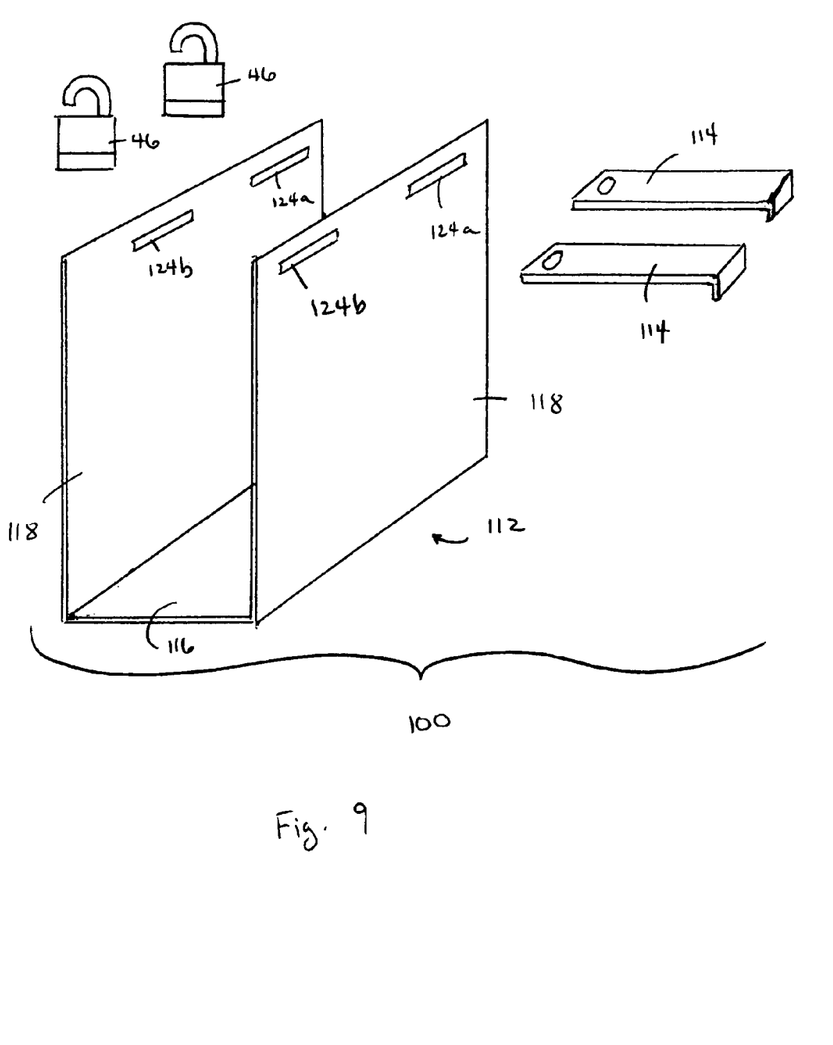
FIGS. 9 and 10 are perspective views of a fifth embodiment of a wheel-immobilizing device according to the invention, with FIG. 9 illustrated the device in an unlocked configuration and FIG. 10 illustrating the device in a locked configuration.
Figure 10:
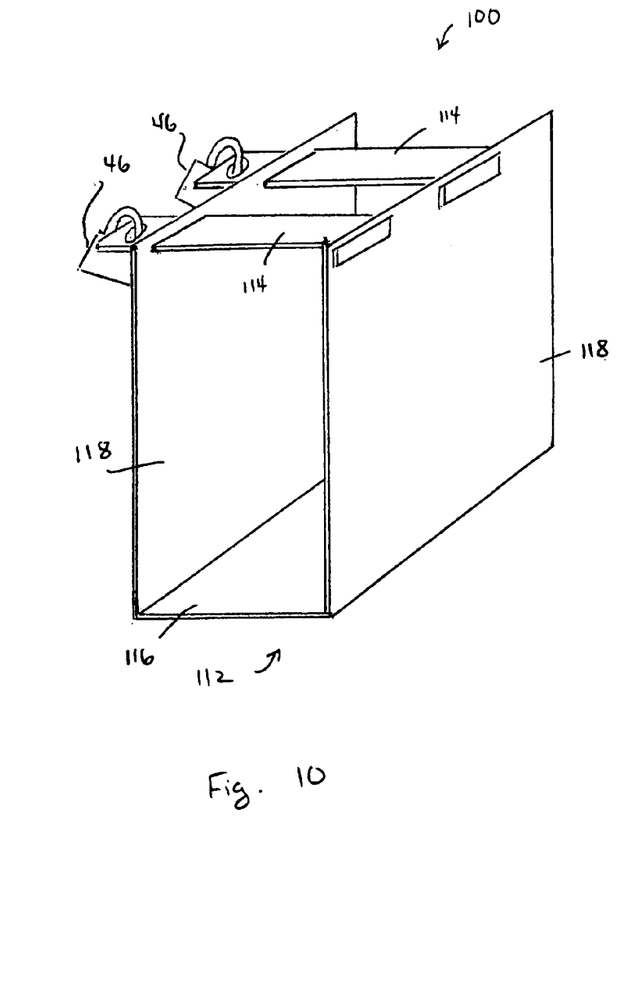

Another embodiment of the invention 100 utilizing two locking bar cross members is illustrated in FIGS. 9 and 10. This embodiment 100 has a base unit 112 and a pair of locking bar cross members 114 and 114. The base unit 112 has a base member 116 and a pair of side walls 118 extending upwardly from the base member 116. The side walls 118 have two pairs of slots 124a and 124b, through which the locking bar cross members 114 pass. The locking bar cross members 114 are both configured and fabricated the same as the locking bar cross member 14 illustrated in each of the embodiments described above.

The embodiment of the invention 100 is used in generally the same manner as the embodiments described above. In particular, the base unit 112 is placed on the ground or floor in front of one of the casters of the cabinet being secured (not illustrated), and the cabinet is moved so that the caster rolls up onto the top of the base member 116. The cabinet is positioned so that the stem of the caster (not illustrated) is located between the two sets of slots 124a and 124b, then the locking bar cross members 114 are passed through the slots 124a and 124b and secured in position, e.g., with padlocks 46, as illustrated in FIG. 10.

Figure 11A:
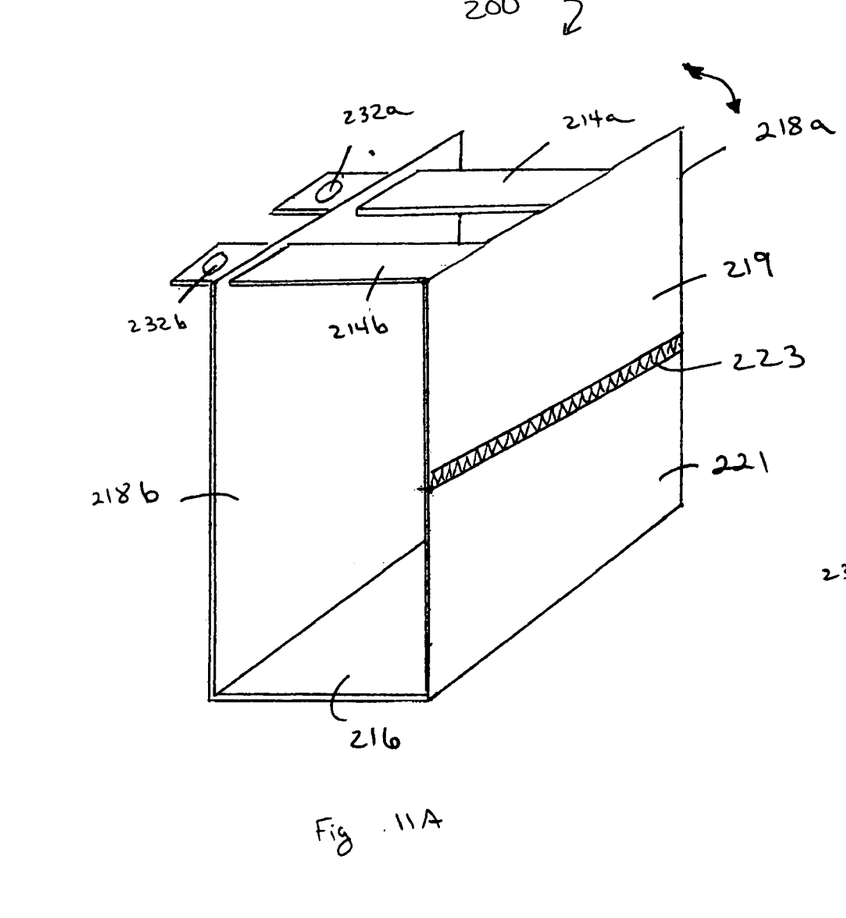
FIGS. 11A and 11B are a perspective view and a top view, respectively, of a sixth embodiment of a wheel-immobilizing device according to the invention, with both views illustrating the device in a locked configuration.
Figure 11B:
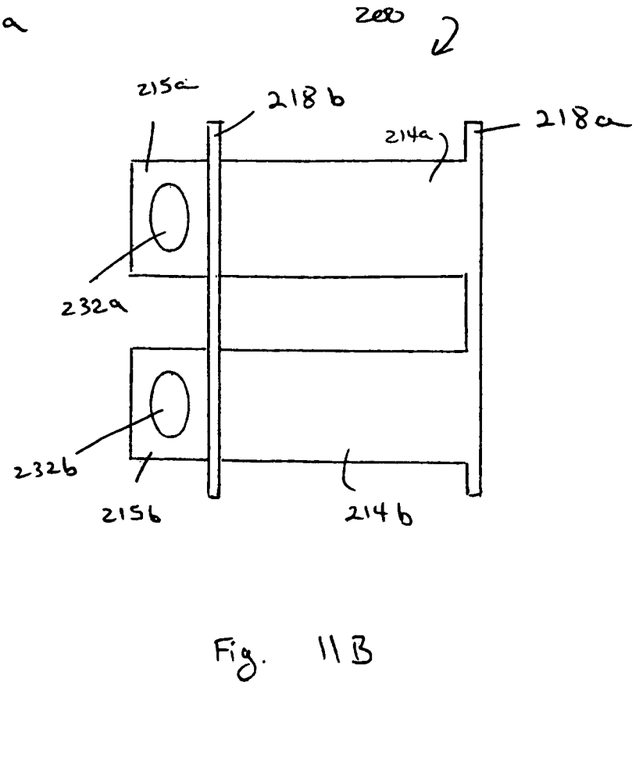

In yet another embodiment of the invention 200 illustrated in FIGS. 11A and 11B, one of the two side walls 218a and 218b, e.g., side wall 218a, is formed from lower and upper portions 219 and 221, respectively. The lower and upper portions 219 and 221 are pivotally connected to each other along a hinge 223, and the two locking bar cross members 214a and 214b are integral with and extend from the upper portion 221. The side wall 218b has a pair of slots extending through it at an upper portion thereof, and the free ends 215a and 215b of the locking bar cross members 214a and 214b, respectively, extend through the slots when the upper portion 221 of the side wall 218a is pivoted to the closed position, as illustrated in FIG. 11A.

Operation of the embodiment of the invention 200 is generally the same as operation of the embodiments described above. In particular, the unit is placed on the floor or on the ground with the upper portion 221 of the side wall 218a pivoted outwardly (e.g., by about 90° from the position illustrated in FIG. 11A) so that the locking bar cross members 214a and 214b do not block access into the unit, and the cabinet being secured (not illustrated) is moved so that one of its casters rolls up on top of the base member 216 until the caster stem is located between the slots in the side wall 218b. The upper portion 221 of the side wall 218a is then pivoted into the closed position illustrated in FIG. 11A, thus moving the free ends 215a and 215b of the locking bar cross members 214a and 214b through the slots in the side wall 218b, as illustrated in FIG. 11A. The wheel-immobilizing device is then secured to the caster by attaching a lock to one or both of the free ends 215a and 215b of the locking bar cross members 214a and 214b by means of the lock holes 232a and 232b.

From the foregoing description and the Figures, it will be apparent that numerous configurations of a wheel-immobilizing device are possible that utilize the principles of the invention. Such modifications to and departures from the disclosed embodiments are deemed to fall within the scope of the following claims.

We claim:

1. In combination,
a wheel-immobilizing device, comprising:
   a generally flat base member;
   a pair of spaced apart side members extending upwardly from said base member and defining a wheel-receiving opening therebetween, said side members each having a slot at an upper portion thereof spaced from said base member;
   a first cross member extending between said side members and securely fixed therebetween, said first cross member being located at a position generally opposite to said wheel-receiving opening; and
   a movable second cross member that 1) in a first, open position thereof does not extend between said side members and that 2) in a second, closed position thereof extends through the slot in each of said side members at a position spaced from said first cross member;

wherein said second cross member and said side members are cooperatively configured such that said second cross member can be secured in said second, closed position; and a cart or cabinet supported on a flat surface by at least one stem-mounted wheel, wherein said wheel-immobilizing device is disposed on the flat surface with said side members extending upwardly from said base member, said stem-mounted wheel is disposed on top of said generally flat base member between said pair of spaced apart side members, and said second cross member is secured in the second, closed position with the stem of said stem-mounted wheel extending upwardly between said first and second cross members, whereby rolling movement of said cart or cabinet is impeded by securement of said wheel-immobilizing device to said stem-mounted wheel.

2. The combination of claim 1, wherein said second cross member is removable.

3. The combination of claim 1, wherein said second cross member comprises a generally L-shaped bar having an upright portion and a flange portion extending at an angle relative to said upright portion and said upright portion has a hole formed in a free end thereof that is opposite to said flange portion.

4. The combination of claim 1, wherein said first cross member extends between said side members across a top portion of said wheel-immobilizing device.

5. The combination of claim 1, wherein said first cross member extends between said side members across a front-facing portion of said wheel-immobilizing device.

6. The combination of claim 5, wherein said first cross member extends to said base member.

7. A method of securing a cart or cabinet that is supported on a flat surface by at least one stem-mounted wheel, comprising:

1) providing a wheel-immobilizing device, said wheel-immobilizing device comprising a generally flat base member;

a pair of spaced apart side members extending upwardly from said base member and defining a wheel-receiving opening therebetween, said side members each having a slot at an upper portion thereof spaced from said base member;

a first cross member extending between said side members and securely fixed therebetween, said first cross member being located at a position generally opposite to said wheel-receiving opening; and a movable second cross member that 1) in a first, open position thereof does not extend between said side members and that 2) in a second, closed position thereof extends through the slot in each of said side members at a position spaced from said first cross member;

wherein said second cross member and said side members are cooperatively configured such that said second cross member can be secured in said second, closed position;

2) placing the wheel-immobilizing device on the flat surface in proximity to the stem-mounted wheel in a free-standing position with said side members extending upwardly from said base member and with said second cross member in said first, open position;

3) rolling the wheel of the cart or cabinet over the surface, through said wheel-receiving opening, and into a position on top of said base member and between said side members, with further rolling movement of the cart or cabinet being prevented by said first cross member; and 4) moving said second cross member into said second, closed position and securing it in said second, closed position, with the stem of the wheel extending upwardly between said first and second cross members, whereby rolling movement of said cart or cabinet is impeded by securement of said wheel-immobilizing device to said stem-mounted wheel.

* * * * *